United States Patent
Ong et al.

(10) Patent No.: US 8,957,587 B2
(45) Date of Patent: Feb. 17, 2015

(54) SYSTEMS AND METHODS TO COMMUNICATE AND CONTROL ACTIONS USING LIGHT EMITTING DIODES

(71) Applicant: Disney Enterprises, Inc., Burbank, CA (US)

(72) Inventors: Kenlip Ong, Burbank, CA (US); Armen Mkrtchyan, Burbank, CA (US); Courtney Watkinson, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 14/138,954

(22) Filed: Dec. 23, 2013

(65) Prior Publication Data
US 2014/0111096 A1    Apr. 24, 2014

Related U.S. Application Data

(63) Continuation of application No. 12/886,229, filed on Sep. 20, 2010, now Pat. No. 8,641,470.

(51) Int. Cl.
| | |
|---|---|
| *H05B 33/08* | (2006.01) |
| *H04B 10/114* | (2013.01) |
| *H04B 10/116* | (2013.01) |
| *A63F 3/00* | (2006.01) |
| *A63F 9/10* | (2006.01) |
| *A63F 9/24* | (2006.01) |

(52) U.S. Cl.
CPC ........ *H05B 33/0842* (2013.01); *H04B 10/1143* (2013.01); *H04B 10/116* (2013.01); *A63F 3/00643* (2013.01); *A63F 2009/1061* (2013.01); *A63F 2009/2444* (2013.01); *A63F 2009/2454* (2013.01)
USPC .......................................... 315/150; 446/175

(58) Field of Classification Search
None
See application file for complete search history.

(56) References Cited

U.S. PATENT DOCUMENTS

| | | | | |
|---|---|---|---|---|
| 5,779,574 | A * | 7/1998 | Allman et al. | 473/570 |
| 2010/0141153 | A1 * | 6/2010 | Recker et al. | 315/149 |

* cited by examiner

*Primary Examiner* — Crystal L Hammond
(74) *Attorney, Agent, or Firm* — Buckley, Maschoff & Talwalkar LLC

(57) ABSTRACT

In some embodiments, a signal of light may be emitted from an illumination source of a first transceiver. A second transceiver may detect a signal of light from the first transceiver that exceeds a threshold luminosity; and activate, in response to the detecting of the signal of light that exceeds the threshold luminosity, an illumination source of the second transceiver to illuminate. An intensity of the illumination source of the first transceiver may then be reduced in response to the activating of the illumination source of the second transceiver to illuminate.

23 Claims, 5 Drawing Sheets

US 8,957,587 B2

SYSTEMS AND METHODS TO COMMUNICATE AND CONTROL ACTIONS USING LIGHT EMITTING DIODES

CROSS-REFERENCE TO RELATED APPLICATIONS

The present application is a continuation of U.S. patent application Ser. No. 12/886,229 filed Sep. 20, 2010 (pending). The entire content of that application is incorporated herein by reference.

FIELD

The present invention relates to systems and methods of interactive communication. Some embodiments relate to systems and methods for efficiently communicating and controlling actions using light emitting diodes.

BACKGROUND

A device, system, or article might include a switch that a user physically manipulates in order to activate a function of the device, system, or article. For circumstances where such direct physical manipulation of a switch might not be desired, other types of switching devices, such as a switch having magnets, might be used. For example, a toy may include an embedded magnet in one component and a magnetic switch in a second component that is actuated by the embedded magnet. However, magnetic switches typically require mating switch parts to touch or nearly touch each other. Additionally, the types of switches discussed thus far conventionally operate between two states—an open state and a closed state. No other functionality or communication information is provided by these types of switches or devices. Moreover, these types of switches and devices often do not offer aesthetic or informative value to the user. As such, these types of switching mechanisms offer limited application flexibility and do not provide an indication or status feedback other than the state of the switch itself (i.e., either on or off).

DETAILED DESCRIPTION

Applicants have recognized that there is a need for methods, systems, apparatus, means and computer program products to efficiently communicate between devices and control functions of the devices. In some embodiments, these aspects of communication and control may be implemented in the context of interactive play involving devices that may communicate with each other.

A light-emitting diode (LED) is a semiconductor device having the characteristics of being able to operate as both a light source and a detector of a light source. In general, when a light-emitting diode is forward biased (switched on), the LED releases energy in the form of photons of light. Furthermore, LEDs can also detect light and may be used as optical detectors. Given the dual functionality of LEDs to both transmit light and receive light, LEDs may be considered a transceiver of signals (e.g., light signals). As discussed herein, a LED is alternately referenced as a transceiver having an illumination source. The illumination source of the transceiver (i.e., LED) functions to provide a light source when the transceiver is appropriately biased and also operates to detect light shone thereupon in other modes of operation. Accordingly, an LED may be referred to herein interchangeably with the term transceiver.

Figure 1:
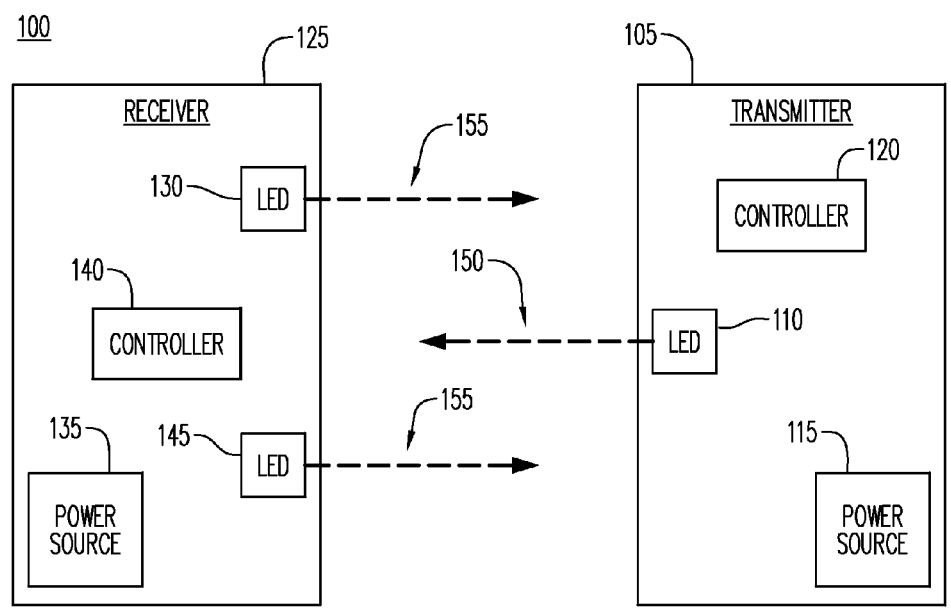
FIG. 1 is a block diagram of a system in accordance with some embodiments of the present invention.

FIG. 1 is a block diagram of a system 100 in accordance with some aspects and embodiments herein. System 100 includes a transmitter 105, the transmitter including a light emitting diode (LED) 110, a power source 115 to provide, for example, power to LED 110, and a controller 120 to control, at least in part, one or more functions of transmitter 105. LED 110, power source 115, and controller 120 may be connected to each other as needed to perform the functions and methods described herein by a wired and/or wireless system of interconnections (not shown). Controller 120 may be one or more of a processor, a microprocessor, a logic module, and a switch (es) that may be implemented in hardware, software, and combinations thereof. In some embodiments, transmitter 105 may include a plurality of LEDs.

System 100 may also include a receiver 125. Receiver 125 includes, in some embodiments, a LED 130, a power source 135 to provide energy to receiver 125, and a controller 140. LED 130, power source 135, and controller 140 may be connected to each other by a wired and/or wireless system of interconnections (not shown) in order to perform certain aspects of the methods that will be described in greater detail below. In some embodiments, receiver 125 may also include a second LED 145 that is associated with receiver 125. In some aspects, second LED 145 may be located on or in receiver 125, but not necessarily coincident or adjacent to LED 130. Controller 140 may include one or more of a processor, a microprocessor, a logic module, switches, and other control mechanisms, including hardware, software, and combinations thereof.

LEDs may function as a light source (e.g., illumination of the LED), as well as a sensor of light (e.g., light incident upon a LED may alter the electrical characteristics, such as the resistivity, of the LED). This dual functionality of LEDs may be leveraged to provide an efficient means and mechanism of communicating using signals of light generated and/or detected by the LEDs and providing a control mechanism based on signals of light sensed or detected by the LEDs. LEDs typically emit and detect a signal of light having a narrow bandwidth. As such, LEDs may be used to generate and detect select signals of light as determined based on the characteristics of the LEDs used.

In the example of FIG. 1, LED 110 of transmitter 105 may be powered and controlled to emit a signal of light, such as for example, signal 150. Likewise, a signal of light 155 may be emitted by LED 130 and/or second LED 145. In some embodiments, transmitter 105 and receiver 125 may include more, fewer, or other components than those specifically depicted in FIG. 1.

Figure 2:
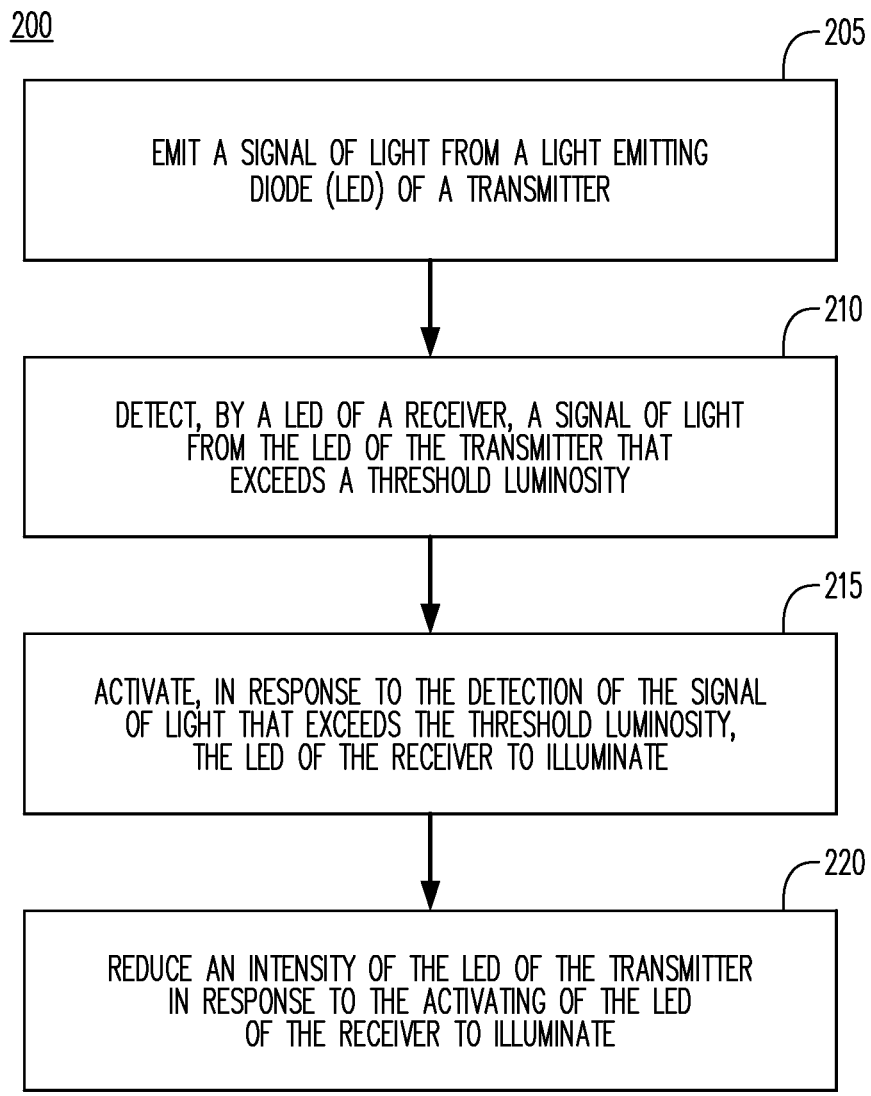
FIG. 2 is a flow chart of a method in accordance with some embodiments of the present invention.

FIG. 2 illustrates a method 200 that might be performed, for example, by some or all of the elements described herein. The flow charts described herein do not imply a fixed order to the steps, and embodiments of the present invention may be practiced in any order that is practicable. Furthermore, any of the methods described herein may be performed by hardware, firmware, software, or any combinations thereof. As an example, a computer-readable storage medium may store instructions thereon that when executed by a machine result in performance(s) according to any of the embodiments described herein. Method 200 and all other processes mentioned herein may be embodied in processor-executable instructions read from one or more computer-readable media or program product, such as a floppy disk, a CD-ROM, a DVD-ROM, a flash drive, and a magnetic tape, and then stored in a compressed, uncompiled and/or encrypted format. In some embodiments, hard-wired circuitry may be used in place of, or in combination with, instructions for implementation of processes according to some embodiments. Embodiments are therefore not limited to any specific combination of hardware and software or other computer program product.

At 205, a signal of light 150 is emitted from LED 110 of transmitter 105. As used herein, the phrase "signal of light" may refer to any spectrum of light generated by a LED herein, such as light in the visible spectrum or the infrared spectrum of light. In some embodiments, the characteristics of the signal 150 generated and emitted due to an illumination of LED 110 may be determined by the electrical characteristics of the LED selected for implementing transmitter 105.

In some embodiments, the signal of light 150 emitted by LED 110 may be selectively modulated to further control the characteristics of the emitted signal of light. The emitted signal of light may be modulated by altering or controlling, for example, a color of the light emitted, an intensity, a frequency, a bandwidth, a rate of state changes (e.g., a rate of turning the LED on and off), and other aspects of the light signal emitted by LED 110.

At 210, receiver 125 detects the signal of light 150 emitted from LED 110. More particularly, LED 130 of receiver 125 detects whether the signal of light 150 is incident upon it. In the instance the signal of light 150 is detected or sensed as shining on LED 130 of the receiver, method 200 proceeds to operation 215. Otherwise, process 200 may remain at operation 210 or in some embodiments terminate.

In some embodiments, LED 130 is "tuned" to detect a signal from LED 110 (and other similar light sources) based on a compatibility of electrical and optical characteristics of LEDs 110 and 130. In this manner, signals of light from light sources dissimilar to LED 105 may not be detected by LED 130. For example, ambient light may not be detected or sensed by LED 130 since the ambient light may not have the particular characteristics (e.g., particular spectrum of light, coherence, frequency of turning off and on, etc.) of the transmitter's LED 110.

In some embodiments as illustrated by process 200, receiver LED 130 operates to detect a threshold luminosity of the signal of light 150 before the process proceeds to operation 215. The threshold luminosity may be determined, set, or otherwise used to set a desired sensitivity of receiver to signal of lights.

At 215, LED 130 may be illuminated in response to a detection of the signal of light 150 that exceeds the threshold luminosity. Accordingly, LED 130 functions to both provide a source of light and detect a signal of light.

Continuing to 220, an intensity of the signal of light 150 being emitted from LED 110 of transmitter 105 is reduced in response to the illumination of LED 130 of the receiver. In some embodiments, LED 110 blinks or alternates between an ON state (i.e., illuminating) and an OFF state (i.e., not illuminating). During its ON state, LED 110 is in a lighting mode and provides the light signal 150 that may be detected by LED 130 of receiver 125. During its OFF state, LED 110 is in a receive or light detection mode, as is characteristic for LEDs. If a light signal from LED 130 of receiver 125 is detected by LED 110 while it is in light detection mode, then the intensity of the light emitted by LED 110 in its subsequent ON states is reduced.

In some embodiments, LED 130 also blinks or alternates between an ON state and an OFF state. During its ON state, LED 130 is in a lighting mode and provides the light signal 155 that may be detected by LED 110 of transmitter 105. During its OFF state, LED 130 is in its light detection mode, as discussed in connection with operation 210. If a light signal from LED 110 of transmitter 105 is detected by LED 130 while it is in light detection mode, then the intensity of the light emitted by LED 130 in its subsequent ON states is increased.

The increase in the intensity of the receiver's LED illumination in conjunction with the transmitter's LED 110 reduction in illumination intensity in response to the illumination of the receiver's LED 130 operates to convey or indicate light from transmitter 105 is collected or transferred to receiver 125. The outward, visible indication of transferring light from the transmitter to the receiver is accomplished by LED's 110 and 130 operating as both a source of light and as a light detector, in accordance with embodiments herein. According to method 200, the communication between transmitter 105 and receiver 125 is bi-directional, as both the transmitter and the receiver may transmit and receive communicate (e.g., light) signals.

In some embodiments, the intensity of the illumination of LED 130 of the receiver continues to increase up to a maximum as the signal of light is "collected" from LED 110 of the transmitter, and the intensity of the illumination of LED 110 of the transmitter continues to decrease down to a minimum (e.g., OFF state) as the signal of light is "transferred" from LED 110 of the transmitter.

In some embodiments, the reduction in the illumination intensity of the transmitter's LED 110 in response to the activation of the illumination of the receiver's LED 130 is accomplished automatically, without other inputs or actions.

In some embodiments also in accordance with the present disclosure, receiver 125 includes a second LED 145 that is associated with the receiver. This second LED 145 may be located on, in, or at least near receiver 125 and is electrically coupled to LED 130, power source 135, and controller 140 to facilitate the operations and functions disclosed herein. In some aspects, a detection of the signal of light 150 from LED 110 of transmitter 105 at operation 210 may cause second LED 145 to illuminate also or instead of LED 130. In this manner, LED 130 operates to detect the signal of light, as well as proved a signal or trigger that invokes an illumination of second LED 145.

In some embodiments, the intensity of the illumination of second LED 145 of the receiver continues to increase up to a maximum as the signal of light is "collected" from LED 110 of the transmitter, and the intensity of the illumination of LED 110 of the transmitter continues to decrease down to a minimum (e.g., OFF state) as the signal of light is "transferred" from LED 110 of the transmitter.

Figure 3:
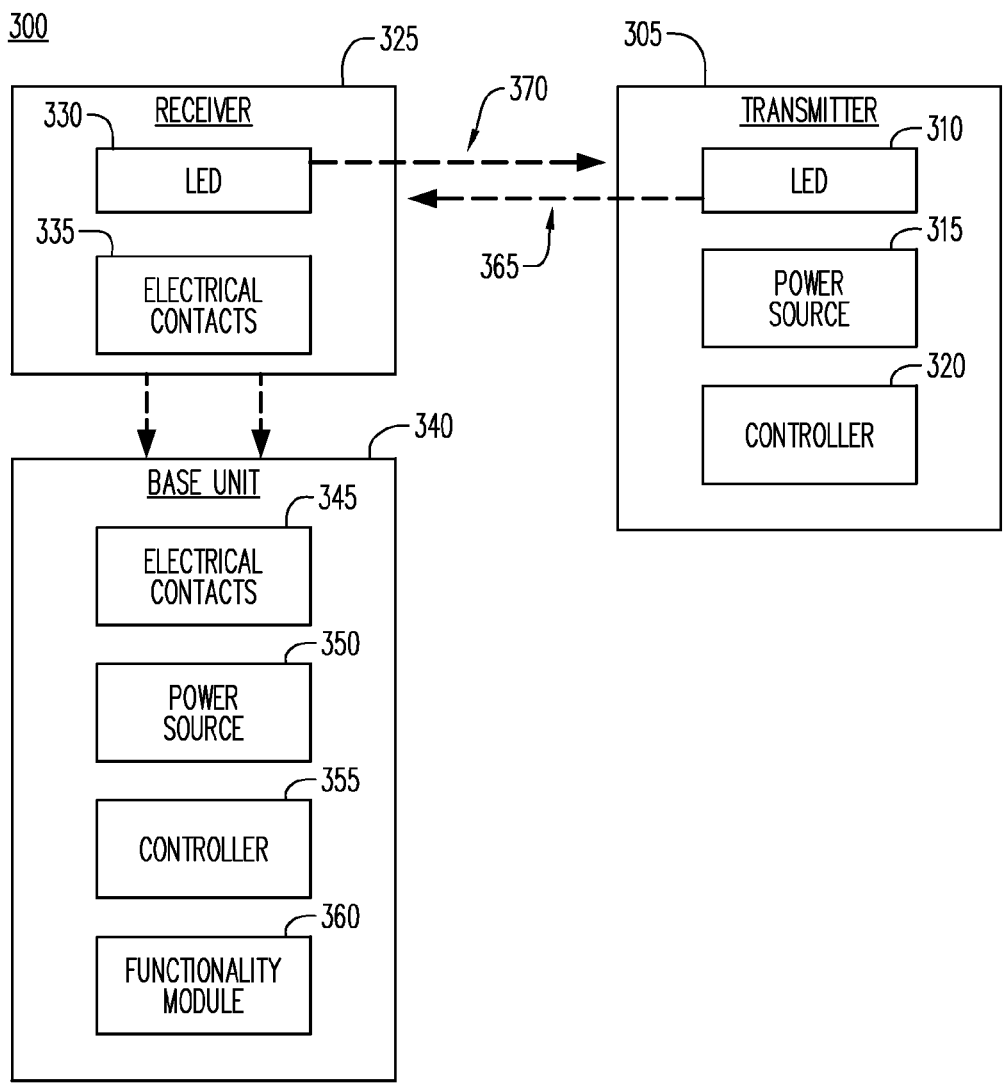
FIG. 3 is a block diagram of a system in accordance with some embodiments of the present invention.

FIG. 3 is a block diagram of a system 300 in accordance with some aspects and embodiments herein. System 300 includes a transmitter 305, where the transmitter includes a LED 310, a power source 315 to provide power to LED 310, and a controller 320 to control, at least in part, one or more functions of transmitter 305. LED 310, power source 315, and controller 320 may be connected to each other as needed to perform the functions and methods disclosed herein. Controller 320 may be one or more of a processor, a microprocessor, a logic module, and a switch(es) that may be implemented in hardware, software, and combinations thereof. In some embodiments, transmitter 305 may include a plurality of LEDs.

System 300 further includes a receiver 325. Receiver 325 includes a LED 330 and electrical contacts or other means or mechanisms (e.g., wired or wireless) for coupling or connecting the receiver to a base or main unit 340. Base unit 340 includes electrical contacts or other means or mechanisms (e.g., wired or wireless) for coupling, connecting, or otherwise interfacing the base unit to receiver 325, a power source 350 to provide energy to base unit 340 and receiver 325. Base unit 340 further includes a controller 355 that provides processing and control functionality to base unit 340 and receiver 325 when coupled to the base unit, and to a functionality module 360.

Functionality module 360 may include mechanisms for initiating, activating, or invoking one or more functions, including, for example, a processing function of various inputs and signals thereto, a playback or generation of an audio file (e.g., scripted responses, music file playback, voice messages), activation, initiation, and execution of other functions including mechanical, electrical, hardware, and software aspects, as well as combinations thereof.

The various components of base unit 340, including activation contacts 345, power source 350, controller 355, functionality module 360, and LED 330 when coupled to the receiver may be connected to each other by a wired and/or wireless system of interconnections (not shown) to facilitate certain aspects of the methods described herein.

The LEDs depicted in FIG. 3, in a manner similar to the LEDs discussed with regard to FIGS. 1 and 2, may also exhibit the dual functionality of being a light source, as well as being a sensor of a signal (e.g., a light incident upon the LED that is operable to alter the electrical characteristics of the LED).

In the example of FIG. 3, LED 310 of transmitter 305 may be powered and controlled to emit a signal of light, such as for example, signal 365. Likewise, a signal of light 370 may be emitted by LED 330 or another light source. In some embodiments, the other light source may comprise functionality module 360. In some embodiments, system 300 may include more, fewer, or other components than those specifically depicted in FIG. 3, including for example modifications of transmitter 305, receiver 325, and base unit 340.

Figure 4:
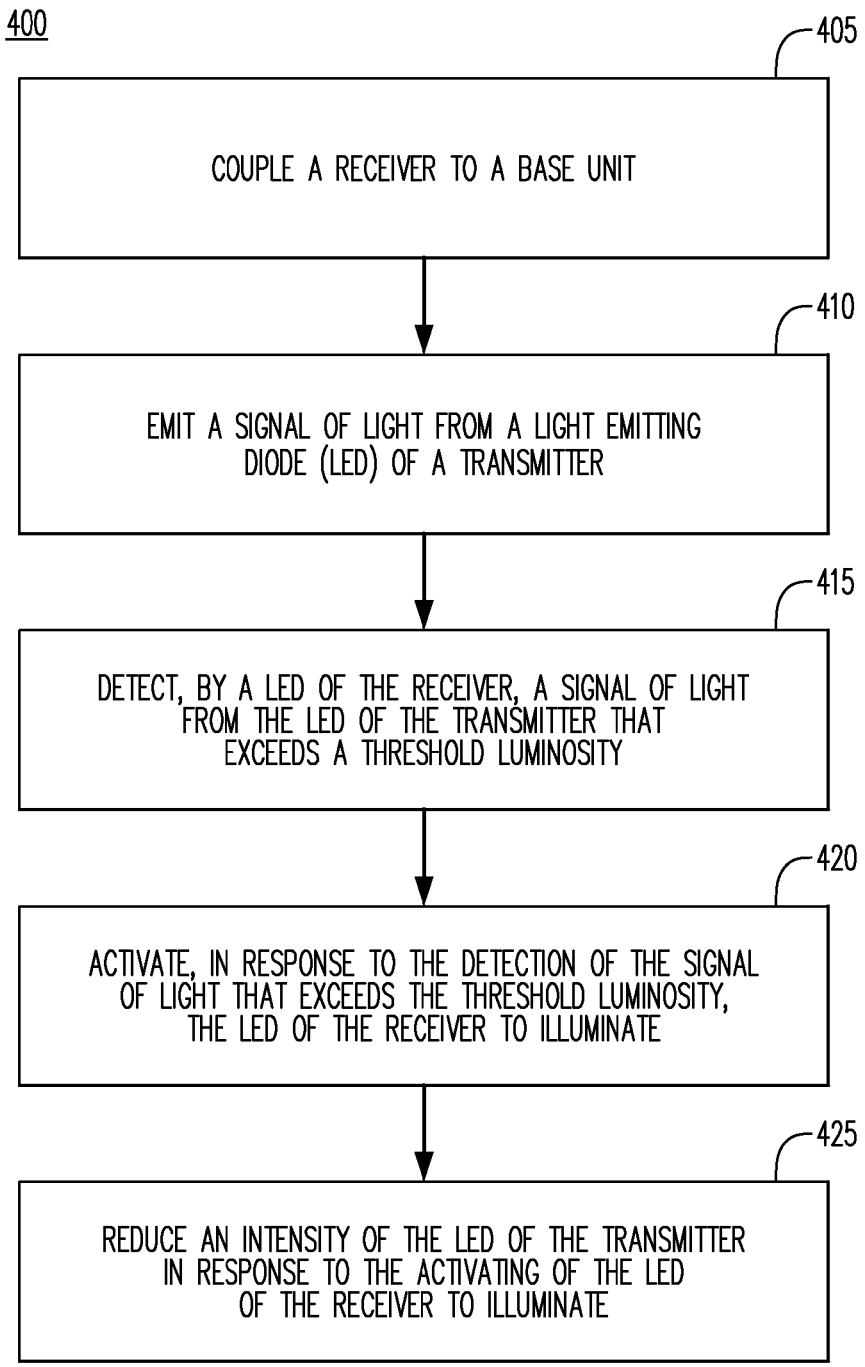
FIG. 4 is a flow chart of a method in accordance with some embodiments of the present invention.

FIG. 4 illustrates a method 400 that might be performed, for example, by some or all of the elements described herein including the elements of FIG. 3. At 405, receiver 325 is coupled, interfaced with, or otherwise placed in electrical communication with base unit 340. The coupling of receiver 325 and base unit 340 may be accomplished by the use of mating contact points, devices, and systems.

At 410, a signal of light 365 is emitted from LED 310 of transmitter 305. In some embodiments, the characteristics of the signal of light 365 generated and emitted due to an illumination of LED 310 may be determined by the electrical characteristics of the LED selected for implementing transmitter 305.

It is noted that in some embodiments, the signal of light 365 emitted by LED 310 may be selectively modulated to further control the characteristics of the signal, just as other signals generated by other LEDs herein may be modulated. The emitted signal of light may be modulated by altering or controlling, for example, a color of the light emitted, an intensity, a frequency, a bandwidth, a rate of state changes (e.g., a rate of turning the LED on and off), and other aspects of the light signal emitted by LED 310.

At 415, receiver 325 that is coupled to base unit 340 detects the signal of light 365 emitted from LED 310. In some aspects, LED 330 of receiver 325 detects whether the signal of light 365 is incident upon LED 330. In the instance the signal of light 365 is detected or sensed as shining on LED 330 of the receiver, method 400 flows to operation 420. Otherwise, process 400 may remain at operation 415 or in some embodiments terminate.

In some embodiments, LED 330 is "tuned" to or otherwise selectively detects a signal from LED 310 (and other similar light sources) based on a compatibility of electrical and optical characteristics of LEDs 310 and 330. Accordingly, receiver 325 may effectively filter unwanted signals of light from incompatible and/or undesired light sources.

As further illustrated by method 400, receiver LED 330 operates to detect a threshold luminosity of the signal of light 365 at 415 before the process proceeds to operation 420. The threshold luminosity may be determined, set, or otherwise used to establish a desired sensitivity of receiver 325 to a signal of light.

Continuing at 420, LED 330 may be illuminated in response to a detection of the signal of light 365 that exceeds the threshold luminosity. Thus, LED 330 may function to provide both a source of light and detect a signal of light.

At 425, an intensity of the signal of light 365 being emitted from LED 310 of transmitter 305 may be reduced in response to the illumination of LED 330 of the receiver. In some embodiments, LED 310 blinks or alternates between an ON state and an OFF state. During its ON state, LED 310 is in a lighting mode and provides the light signal 365 that may be detected by LED 330 of receiver 325. During its OFF state, LED 310 is in a receive or light detection mode. In an instance a light signal from LED 330 of receiver 325 is detected by LED 310 while LED 310 is in light detection mode, then the intensity of the light emitted by LED 310 in its subsequent ON states is reduced.

In some embodiments, and in an instance a light signal from LED 310 of transmitter 305 is detected by LED 330 while LED 330 is in light detection mode, then the intensity of the light emitted by LED 330 in its subsequent ON states is increased.

The increase in the intensity of the receiver's LED 330 illumination in conjunction with the transmitter's LED 310 reduction in illumination intensity in response to the illumination of the receiver's LED 330 may operate to convey or indicate light from transmitter 305 is collected or transferred to receiver 325. This outward, visible and perceptible indication of transferring light from the transmitter to the receiver is accomplished by LED's 310 and 330 operating as both a source of light and as a light detector, in accordance with embodiments herein.

In some embodiments, the intensity of the illumination of LED 330 of the receiver continues to increase up to a maximum as the signal of light is "collected" from LED 310 of the transmitter, and the intensity of the illumination of LED 310 of the transmitter continues to decrease down to a minimum (e.g., OFF state) as the signal of light is "transferred" from LED 310 of the transmitter.

In some embodiments, the reduction in the illumination intensity of the transmitter's LED 310 in response to the activation of the illumination of the receiver's LED 330 is accomplished automatically, without other inputs or actions.

In some embodiments as illustrated in FIG. 3, base unit 340 includes a functionality module 360. Functionality module 360 may be located on, in, or at least near base unit 340 and may be electrically coupled to one or more of controller 355, power source 350 and electrical contacts 345 that interface with electrical contacts 335 of the receiver. In some aspects, a detection of the signal of light 365 from LED 310 of transmitter 305 at operation 415 may cause an aspect of functionality module 360 to also activate with LED 330. In this manner, LED 330 may operate to detect the signal of light and provide a source of light, as well as provide a signal or trigger that invokes a functionality of functionality module 360 associated with base unit 340.

In some embodiments, one or more receivers 325 may be interfaced with or coupled to main unit 340. In some aspects, the one or more receivers 325 may share a common configuration with respect to the electrical contacts 335 such that the one or more receivers may be selectively interchanged to interface with base unit 340.

In some aspects, the controllers herein may be in communication with or include a storage device (not shown). The storage device may comprise any appropriate information storage device, including combinations of magnetic storage devices (e.g., hard disk drives), optical storage devices, and/or semiconductor memory devices such as Random Access Memory (RAM) devices and Read Only Memory (ROM) devices.

The storage device may store program instructions and code for controlling aspects of any of the methods and systems herein. The controller may execute the instructions or code to thus operate in accordance embodiments of the present disclosure.

Some embodiments described herein utilize capabilities of the dual functionality of LEDs to provide a source of light and detect a signal of light. The transmitters, receivers, and base units disclosed herein may be implemented and embodied in a variety of devices, systems, and configurations. In some instances, the transmitters, receivers, and base units herein data may be embodied in or with a variety of interactive toy and play pieces to provide an enhanced entertainment experience. A variety of device configurations may be employed to provide a wide range of interactive contexts and/or experiences.

Figure 5:
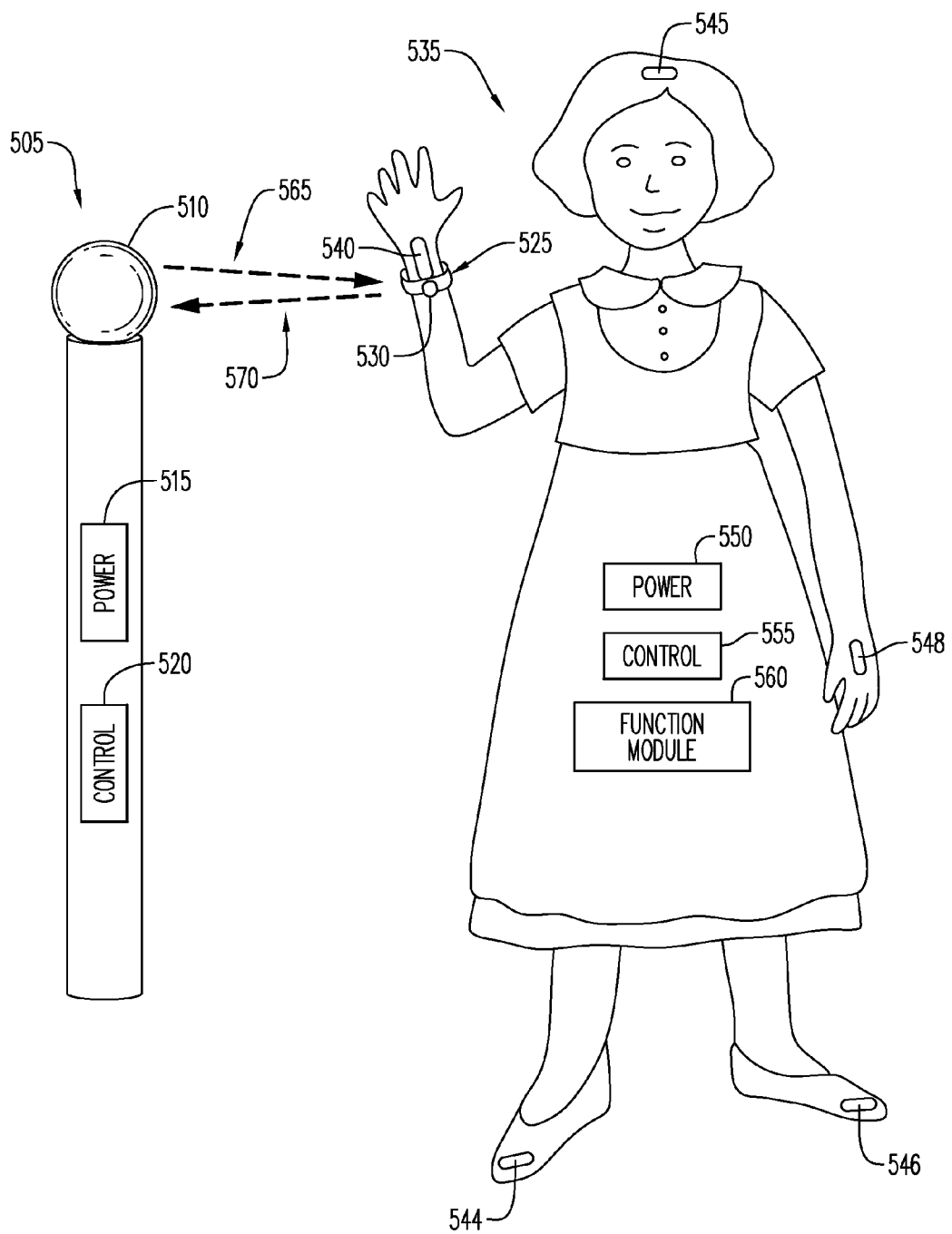
FIG. 5 illustrates a system in accordance with some embodiments of the present invention.

For example, in some embodiments such as FIG. 5, a system 500 may include a transmitter comprising a "magic" wand 505, a receiver may include a jewelry accessory 525, and a base unit may include a doll 535. It is noted that each of the components of system 500 may be embodied or configured as other objects, depending on a context or environment. As such, and in keeping with the interactive play example of FIG. 5 but not limited thereto, any of the components of FIG. 5 may include various play pieces. For example, components of FIG. 5 may include an action figure, a play structure, a toy vehicle (e.g., walk behind, ride-on, hand held, etc.), a board or card game component, and any type of playscape component.

The "magic" wand 505 (i.e., transmitter) includes a LED 510, a power source 515 to provide power to LED 510, and a controller 520 to control, in some aspects, one or more functions of the "magic" wand 505. LED 510, power source 515, and controller 520 may be in communication with each other to perform the functions and methods disclosed herein. Controller 520, as well as the other controllers herein, may be one or more of a processor, a microprocessor, a logic module, and a switch(es), and may further include a memory module (e.g., ROM or RAM). In some embodiments, the "magic" wand 505 may include more than one LED.

System 500 further includes a receiver in the form of a jewelry accessory 525. The jewelry accessory 525 includes a LED 530 and electrical contacts or other means or mechanisms (e.g., wired or wireless) for coupling or connecting the jewelry accessory to the doll or base unit 535. Doll 535 includes a number of electrical contacts or other means or mechanisms 540, 544, 545, 546, and 548 for coupling, connecting, or otherwise interfacing the doll with jewelry accessory 525 and/or any other add-on accessory. In some embodiments, add-on accessories my include a tiara, a necklace, a bracelet, earrings, articles of clothing, sports equipment, tools, and other devices. Doll 535 further includes a power source 550 to provide energy to the doll and jewelry accessory 525 (e.g., LED 530). Doll 535 also includes a controller 555 that provides processing and control functionality to doll 535 and jewelry accessory 525 when it is coupled to the doll.

Doll 535 also includes a functionality module 560. Functionality module 560 may include mechanisms for initiating, activating, or invoking one or more functions, including, for example, processing various inputs and signals thereto, providing a playback of an audio file (e.g., scripted messages, music files, etc.), and an activation, initiation, and execution of other functions including mechanical, electrical, hardware, and software aspects, as well as combinations thereof.

LEDs of system 500 may behave in a manner consistent in some aspects to the LEDs discussed hereinabove regarding FIGS. 1-4. For example, LEDs 510 and 530 may also exhibit the dual functionality of being a light source, as well as being a sensor of a signal and provider of a trigger signal to, for example, control actions other than the LEDs.

In the example of FIG. 5, LED 510 of the "magic" wand 505 may be powered and controlled to emit a signal of light 565. Also, jewelry accessory 525 is coupled to or otherwise placed in electrical communication with doll 535. The coupling of jewelry accessory 525 and doll 535 may be accomplished by the use of mating electrical contact points, devices, and systems.

In accordance with aspects herein, a signal of light 565 is emitted from LED 510 of the "magic" wand 505. Jewelry accessory 525 that is coupled to doll 535 detects the signal of light 565 emitted from LED 510. In some embodiments, LED 530 of jewelry accessory 525 operates to detect a threshold luminosity of the signal of light 565.

In response to a detection of the signal of light 565 by the jewelry accessory's LED 530, LED 530 is illuminated to emit signal 570. Additionally, a signal or trigger is forwarded from LED 530 to controller 555. Controller 555 may then act to initiate or activate a functionality of the doll as implemented by functionality module 560. Thus, LED 530 functions to provide both a source of light and to detect a signal and provide an indication of that signal detection for activating or triggering a function of doll 535.

In some embodiments, an intensity of the signal of light 565 being emitted from LED 510 of transmitter 505 may be reduced in response to the illumination of LED 530 of jewelry accessory 525. The increase in the intensity of the jewelry accessory's LED illumination in conjunction with the "magic" wand's LED 510 reduction in illumination intensity may operate to communicate, convey or indicate that light from "magic" wand 505 is collected or transferred to jewelry accessory 525. This visible and perceptible indication of transferring light from the "magic" wand to the jewelry accessory is accomplished by LED's 510 and 530 operating as both a source of light and as a light detector, in accordance with embodiments herein. The "collection" of light in the manner disclosed herein may be utilized to enhance an interactive play experience.

In some embodiments, and in a context of interactive play, an item such as jewelry accessory 525 may be rewarded, obtained, captured, or otherwise collected by a user after the user interacts with the play piece to illuminate or light up the play piece. In some aspects, a user may interact with one or more play pieces including a transmitter, a receiver, and a base unit in accordance with embodiments herein with an objective of illuminating the play pieces and collecting the illuminated play pieces as rewards.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A method, comprising:
emitting a modulated signal of light from an illumination source of a first transceiver, the modulated signal of light having a first characteristic;
detecting, by a second transceiver, a modulated signal of light having the first characteristic from the first transceiver that exceeds a threshold luminosity; and
activating, in response to the detecting of the modulated signal of light that exceeds the threshold luminosity, an illumination source of the second transceiver to illuminate.

2. The method of claim 1, wherein said modulated signal of light is associated with controlling at least one of: (i) a color of the light emitted, (ii) an intensity of the light emitted, (iii) a frequency of the light emitted, (iv) a signal bandwidth, and (v) a rate of state changes.

3. The method of claim 1, further comprising electrically coupling the second transceiver to a base unit, wherein the base unit provides at least one of power and control processing to the second transceiver.

4. The method of claim 3, wherein the base unit comprises at least one of: a doll, a toy animal, a construction set, a puzzle, an action figure, a play structure, a toy vehicle, a board game component, and a playscape component.

5. The method of claim 3, wherein the activating includes invoking a functionality of the base unit in response to the detecting of the modulated signal of light having the first characteristic from the first transceiver that exceeds the threshold luminosity.

6. The method of claim 5, wherein the functionality of the base unit comprises at least one of an electrical action, a mechanical action, an auditory action, a visual action, and a combination thereof.

7. The method of claim 3, wherein the activating includes invoking a functionality of the base unit.

8. The method of claim 1, further comprising collecting the second transceiver subsequent to an activating of the illumination source of the second transceiver to illuminate.

9. The method of claim 1, wherein the second transceiver further comprises more than one transceiver.

10. The method of claim 9, further comprising activating, in response to the second transceiver detecting the modulated signal of light having the first characteristic and exceeding the threshold luminosity, an illumination source of the more than one transceivers of the second transceiver to illuminate.

11. The method of claim 1, further comprising:
detecting, by the first transceiver, light illuminated from the second transceiver; and
reducing an intensity of the illumination source of the first transceiver in response to the detecting of the light illuminated from the illumination source of the second transceiver by the illumination source of the first transceiver.

12. The method of claim 1, wherein the second transceiver comprises a plurality of transceivers each functional to detect the modulated signal of light having the first characteristic from the first transceiver that exceeds a threshold luminosity, and activating, in response to the detecting of the signal of light that exceeds the threshold luminosity by the plurality of second transceivers, the illumination source of each of the plurality of second transceivers to illuminate.

13. A system, comprising:
a first transceiver having an illumination source to emit a modulated signal of light having a first characteristic and to reduce an intensity of the signal of light emitted from the illumination source of the first transceiver in response to a detection of a light signal thereon; and
a second transceiver to detect a modulated signal of light having the first characteristic from the illumination source of the first transceiver that exceeds a threshold luminosity and to activate, in response to a detection of the modulated signal of light having the first characteristic from the illumination source of the first transceiver that exceeds the threshold luminosity, an illumination source of the second transceiver to illuminate.

14. The system of claim 13, wherein said modulated signal of light is associated with controlling at least one of: (i) a color of the light emitted, (ii) an intensity of the light emitted, (iii) a frequency of the light emitted, (iv) a signal bandwidth, and (v) a rate of state changes.

15. The system of claim 13, further comprising a base unit to electrically couple to the second transceiver, the base unit to provide at least one of power and control processing to the second transceiver.

16. The system of claim 15, wherein the base unit comprises at least one of: a doll, a toy animal, a construction set, a puzzle, an action figure, a play structure, a play vehicle, a board game component, and a playscape component.

17. The system of claim 15, wherein the activating includes invoking a functionality of the base unit.

18. The system of claim 17, wherein the functionality of the base unit comprises at least one of an electrical action, a mechanical action, an auditory action, a visual action, and a combination thereof.

19. The system of claim 13, wherein the illumination source of the second transceiver is located on, in, or coupled to the second transceiver.

20. The system of claim 13, wherein the second transceiver is removably attached to the base unit.

21. The system of claim 13, wherein the second transceiver further comprises more than one transceiver.

22. The system of claim 21, wherein the more than one transceivers of the second transceiver is activated to illuminate in response to the more than one transceivers detecting the modulated signal of light having the first characteristic and exceeding the threshold luminosity.

23. The system of claim 13, wherein the second transceiver comprises a plurality of transceivers each functional to detect the modulated signal of light having the first characteristic from the first transceiver that exceeds a threshold luminosity; and to activate, in response to a detection of the signal of light that exceeds the threshold luminosity by the plurality of transceivers, an illumination source of each of the plurality of transceivers to illuminate.

* * * * *